United States Patent [19]

Baskaran et al.

[11] Patent Number: 5,697,043
[45] Date of Patent: Dec. 9, 1997

[54] METHOD OF FREEFORM FABRICATION BY SELECTIVE GELATION OF POWDER SUSPENSIONS

[75] Inventors: Suresh Baskaran; Gordon L. Graff, both of Kennewick, Wash.

[73] Assignee: Battelle Memorial Institute, Richland, Wash.

[21] Appl. No.: 652,872

[22] Filed: May 23, 1996

[51] Int. Cl.$^6$ .................................................. B22F 1/00
[52] U.S. Cl. .......................... 419/30; 419/36; 419/37; 419/38; 419/65; 419/66; 264/463; 264/58; 264/63
[58] Field of Search ........................ 419/30, 36, 37, 419/38, 65, 66; 264/463, 58, 63

[56] References Cited

U.S. PATENT DOCUMENTS

| | | | |
|---|---|---|---|
| 5,204,055 | 4/1993 | Sachs et al. | 419/2 |
| 5,340,656 | 8/1994 | Sachs et al. | 428/546 |
| 5,387,380 | 2/1995 | Sachs et al. | 264/69 |
| 5,490,882 | 2/1996 | Sachs et al. | 134/1 |

FOREIGN PATENT DOCUMENTS 91308980  1/1991  European Pat. Off. .

OTHER PUBLICATIONS

Introduction to the Principles of Ceramic Processing, JS Reed, 1988.

Kelco Technical Bulletin DB-4, Kelco, Chicago, Ill., 1994.

The Effect of Divalent Metals on the Properties of Alginate Solutions, A Haug and O Smidsrod, Acta Chemica Scandinavica 19, 1965 341-351.

Control of Texture in $Al_2O_3$ by Gel Casting, T Carisey et al., Journal of the European Ceramic Society 15, 1995.

Solid Freeform Fabrication Finds New Applications, HL Marcus and DL Bourell, Advanced Materials & Processes, Sep. 1993.

*Primary Examiner*—Charles T. Jordan
*Assistant Examiner*—Anthony R. Chi
*Attorney, Agent, or Firm*—Paul W. Zimmerman

[57] ABSTRACT

The present invention is a novel method for freeform fabrication. Specifically, the method of solid freeform fabrication has the steps of:

(a) preparing a slurry by mixing powder particles with a suspension medium and a gelling polysaccharide;

(b) making a layer by depositing an amount of said powder slurry in a confined region;

(c) hardening a selected portion of the layer by applying a gelling agent to the selected portion; and (d) repeating steps (b) and (c) to make successive layers and forming a layered object. In many applications, it is desirable to remove unhardened material followed by heating to remove gellable polysaccharide then sintering.

37 Claims, 2 Drawing Sheets

METHOD OF FREEFORM FABRICATION BY SELECTIVE GELATION OF POWDER SUSPENSIONS

This invention was made with Government support under Contract DE-AC06-76RLO 1830 awarded by the U.S. Department of Energy. The Government has certain rights in the invention.

FIELD OF THE INVENTION

The present invention relates to solid freeform fabrication. More specifically the invention is the use of a gellable polysaccharide as a binder and adding a gelling agent to gel the binder for freeform fabrication particularly useful for ceramics. In this application, the term suspension is synonymous with the term slurry.

BACKGROUND OF THE INVENTION

Solid Freeform Fabrication

Solid Freeform Fabrication refers to the method or process of converting "virtual objects", for example drawings in electronic format from a computer aided design (CAD) file, to actual solid objects without part-specific tooling. In solid freeform fabrication, a CAD model or drawing of a part or object is electronically sectioned into layers, and the section data transmitted to a solid freeform fabrication machine which then builds the part or object using a sequential, layered or lithographic approach. Solid freeform fabrication techniques are currently used for rapid prototyping, for short-run production, for mold/die making, and have the potential to significantly impact manufacturing. Certain solid freeform fabrication methods may also be used to create unique single-component designs, which are especially useful for parts with internal holes or unmachineable slots.

There are several solid freeform fabrication techniques, but only a few are suitable for fabricating dense ceramic components. The laminated-object-method (CerLOM), under development at Lone Peak Engineering, Draper; Utah, builds ceramic shapes using "green" ceramic/polymer tapes. Individual tapes are cut to a desired pattern layer by layer with successive layers placed upon the previous layers to form a layered object. The layered object is compressed (laminated) and heated to fuse individual layers. Any unwanted cut-out portion(s) is/are dislodged and removed, and the remaining layered block further heated to remove the polymer binder and sinter the ceramic part to high density. The tape lay-up process is currently being automated, and dimensional precision, surface finish and edge definition are being improved. Since unwanted portions of the unfired block need to be removed after lamination, internal cavities and inaccessible holes/slots cannot be fabricated by this specific methodology.

A variation of the laminated-object-method, termed "platelet" technology, (Aerojet-GenCorp, Sacramento, Calif.) can create small internal holes by lamination of pre-cut tapes. This has been demonstrated with silicon nitride engine components. Since the green tapes typically contain $\geq 40$ vol % polymer binder, the process requires extensive handling of organic solvents during tape preparation, and removal of significant amounts of binder before sintering.

A similar tape-based method is also being pursued by CAM-LEM, Inc, Cleveland, Ohio, where internal holes are created by using fugitive tapes that are not loaded with powder. Ceramic components up to 16 mm in pre-fired thickness have been fabricated, but dimensional accuracy and surface finish is still an area of research for complex components.

MIT's (Cambridge, Mass.) three-dimensional printing process builds a porous ceramic object by localized bonding in a dry ceramic powder bed as described in U.S. Pat. No. 5,204,055. This process has been useful in ceramic mold/die making for metal investment casting, and has been licensed to Soligen, Inc., Northridge, Calif. for this application. Dense ceramics can be obtained after cold isostatic pressing (CIP) or warm isostatic pressing (at temperatures above the flow point of added binder) and sintering. Isostatic pressing is possible for many simple shapes, but would be difficult to accomplish for intricate components. Another strategy involves increasing the green density of the powder bed by spraying ceramic powder slurries on every layer of the bed, followed by drying. The dried bed is then printed with binder, and then fired to high density. Specific processing schemes have made this approach useful in meeting diverse component retirements. High density complex-shaped structural components such as silicon nitride turbomachinery does not appear to be practical using current 3D printing methods. Direct production of casting shells with this approach is useful in casting prototypes, if mold requirements such as surface finish can be met. Since coarse granules are required for flowability with this process, each layer thickness is at least 100 microns, which also implies that the characteristic "voxel" (the fundamental building block) dimension is about 100 microns. Surface quality is an important concern in investment casting molds fabricated by this method.

A third approach for solid freeform fabrication of ceramics uses slurries that contain UV-curable diacrylate or acrylamide binders. Specific areas in each layer are hardened by UV exposure, and the object built up in a sequential manner. Silica parts have been fabricated, and dense alumina objects are also possible. A limitation of this process is the difficulty in curing the required layer depths when slurries contain high refractive index powders (such as silicon nitride and zirconia). This UV-Stereolithography approach (SLA) is an extension of the technology developed for plastic components by 3D Systems, and is under development at the University of Michigan, Princeton University, and the University of Toronto.

A fourth method, the Selective Laser Sintering (SLS) process developed by the University of Texas for DTM Corp builds objects by sintering selected areas of a powder layer with a laser. High density ceramic components have not been fabricated with this approach due to the low packing density of the initial powder bed.

A fifth method of freeform fabrication is Fused Deposition Modeling (FDM) or Extrusion Freebody Forming, in which a ceramic powder slurry containing thermally-gelling polymer binders is extruded/injected through a nozzle onto a substrate. The slurry solidifies upon impacting the substrate. This approach is being investigated by Advanced Ceramic Research, Inc., Tucson, Ariz., and more recently by a university-industry consortium led by Rutgers University. High density ceramics with simple geometries have been fabricated using this approach. The issues that need to be resolved With this freeform approach are the complexity in shape that is possible, resolution limits, dimensional control, and elimination of forming defects. A similar jet-solidification approach is also being investigated at the Fraunhofer-Institute in Stuttgart, Germany.

Alginate Gelation in Ceramic Fabrication

The alginates and their properties are well-known in the traditional ceramics industry. Alginic acid is an inexpensive, food-grade polysaccharide most commonly isolated from brown kelp. The unique ability to form strong gels at low polymer concentrations has made alginates very useful in ceramic processing. The monovalent salts of alginic acid ("alginates") are soluble in water, forming viscous solutions at low concentrations. The environmentally-benign alginates are routinely used as processing aids in many traditional ceramic forming processes including dry molding, extrusion, jiggering and slip casting. The alginate binders impart plasticity, workability, suspension stability, wet and dry strength. The alginates are also used as mold coatings to regulate slip casting rates and facilitate mold release.

The chemical gelation behavior of alginates also makes them useful in ceramic fabrication. The ammonium and sodium salts of alginic acid, when prepared as aqueous solutions, undergo chemical gelation in the presence of multivalent cations, particularly calcium. Calcium additions result in strong gels, but other ions, including barium and strontium, are also effective in promoting gelation. As little as 0.4 wt % alginate in water is adequate for forming an aqueous gel structure. The alginate gelation property has been used to fabricate porous ceramic structures, lead zirconate titanate and Y-Ba-Cu-oxide fibers, dense alumina tapes, and dense alumina spheres up to 10 mm in diameter. Some of this gelation work is described in the patent literature, for example JP 61086418 (1986) Preparation of Sintered Particles of Alumina, S. Hideaki et al, and EP 479553 (1991) Production of Porous Ceramics, H. Ichinose.

Structurally, alginic acid is a co-polymer of D-mannuronic and L-guluronic acid building blocks. The poly-guluronic (poly-G) acid groups of the alginates adopt a buckled conformation in solution, forming a cage-like structure that binds the metal ions. Cation binding between poly-G segments on adjacent polymer strands produces a three-dimensional network in solution and results in strong gels. An important feature is that the calcium ions are not locked in place as in a covalent cross-linking mechanism. The presence of the calcium ions in at least a stoichiometric amount cause the chains to draw close together and associate strongly, forming a gel. If excess calcium is undesirable, it is possible to remove the ion from the gelled slurry down to parts-per-million levels.

SUMMARY OF THE INVENTION

The present invention is a freeform fabrication method for ceramic, metallic, polymeric or composite parts using chemically-gelling polysaccharides thereby providing an environmentally benign method of solid freeform fabrication of dense, complex-shaped, articles.

Specifically, the method of solid freeform fabrication has the steps of:

(a) mixing powder particles with a suspension medium and a gelling polysaccharide and forming a powder slurry;

(b) making a layer by depositing an amount of said powder slurry in a confined region;

(c) hardening a selected portion of the layer by applying a gelling agent to the selected portion; and (d) repeating steps (b) and (c) to make successive layers and forming a layered object.

In many applications, it will be necessary to remove any unhardened slurry, followed by washing and drying of the layered object. In some cases heating to remove binders and sintering to densify the layered object may be done.

Specific advantages of using a gellable polysaccharide include high (>50 vol %) powder solids loading of the powder slurry, ability to achieve hardening in selected areas, ability to avoid interlayer defects for layers having thicknesses of about 250 micron or less, and ability to make layers of thicknesses of 100 microns or less.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
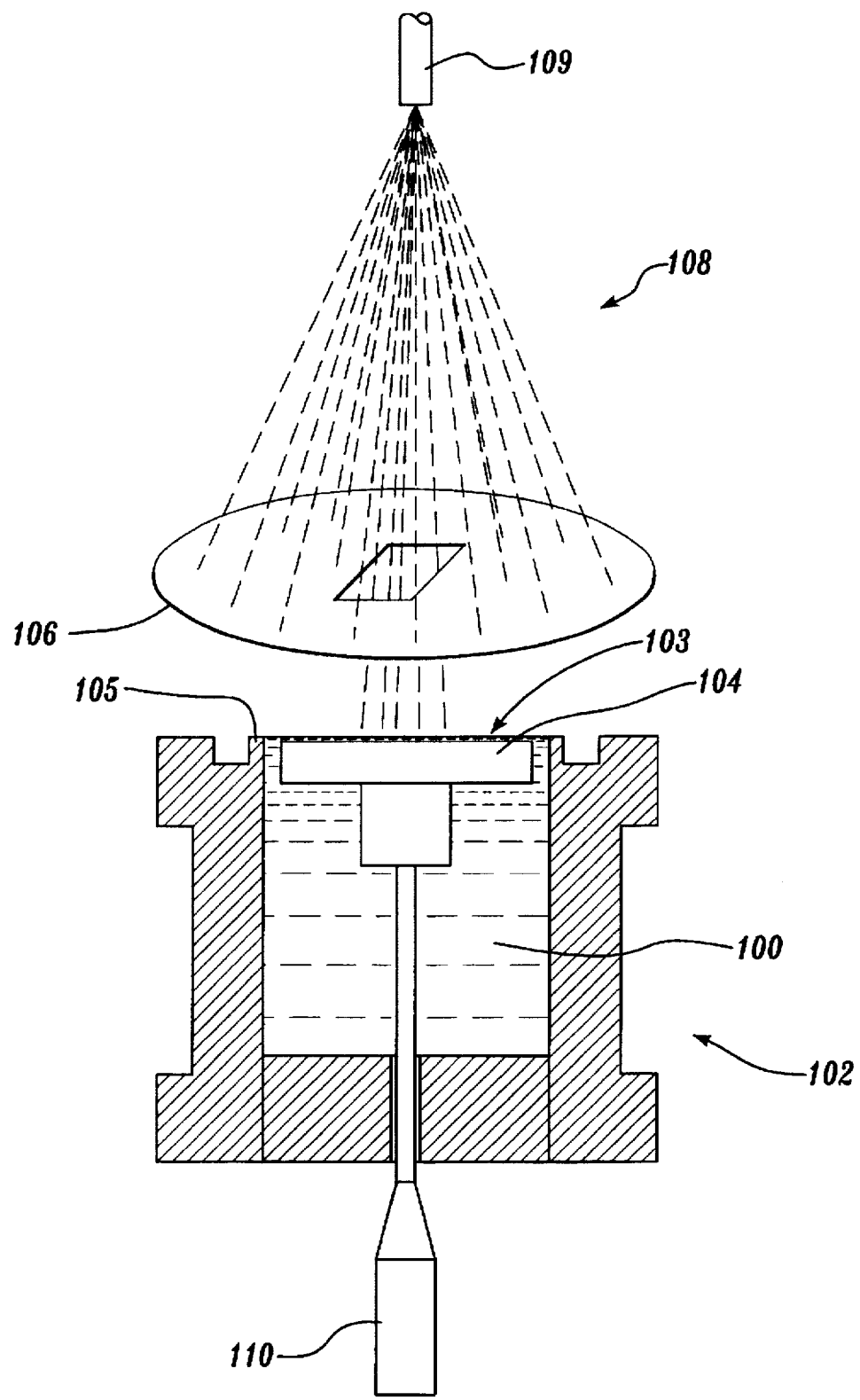
FIG. 1 is a schematic of an apparatus used to demonstrate spray gelation of slurry layers.

The present invention is a method of freeform fabrication having the steps of making a layer of powder slurry and hardening selected portions of the layer, and repeating this process to form a final layered and hardened object. The hardened object may be cleaned to remove unwanted unhardened material or impurities. The hardened object may then be heated to remove any binder and processing additives, and then sintered. The present invention is an improvement having the steps of:

(a) preparing the powder slurry by mixing powder particles with a suspension medium and a gelling polysaccharide;

(b) making the layer by depositing an amount of said powder slurry in a confined region; and wherein (c) the hardening is induced by applying a gelling agent to the selected regions.

Any unhardened slurry may be removed prior to heating and sintering.

The polysaccharide in the slurry may be an alginate, carrageenan, pectin or combinations thereof, which gels in the presence of multivalent ions, changes in the suspension pH, other polysaccharides, or a Combination thereof. Alginates are preferred because they form strong gels in the presence of divalent cations including but not limited to calcium, barium, strontium, and combinations thereof. As little as 0.4 wt % alginate in water is adequate for forming an aqueous gel structure. Alginate concentrations of about 0.1 to 5% by weight of the suspension medium may be used. A dispersant may be added to reduce viscosity of the slurry for high solids loading. Dispersants include but are not limited to ammonium polyacrylate and ammonium citrate. Other processing additives may also be used to improve the properties of the slurry and the gelled object.

The powder is preferably a ceramic material, although metal powders that do not degrade in the slurry environment may also potentially be used to fabricate metal components or mixed ceramic and metal components. Alternatively, polymer powders not amenable to standard polymer forming techniques may be used according to the present invention to make complex shaped polymer articles. Useful ceramic powders include but are not limited to silica, alumina, yttria, zirconia and silicon nitride. Powder particles in the slurry can be of the order of microns to sub-micron in size. The amount of powder can be as high as 65 vol % of the total slurry, beyond which slurries are very viscous. There is no lower limit to powder loading, but typically pre-fired density of 45–60 vol % are needed if sintering to high density is required.

The suspension medium is preferably water. Other suspension media in which polysaccharides are soluble may also be used.

The gelling agent used for hardening is preferably a multivalent cation, specifically as found in a salt solution. Salt solutions include but are not limited to chlorides, acetates, nitrates or combinations thereof. The gelling agent may alternatively be another polysaccharide or a compound added to change pH. The gelling agent may be applied by dripping, spraying or misting on the slurry surface. It is preferred to spray the gelling agent or dispense with a directionally controlled discharge, for example an ink jet printer, to control the amount of gelling agent solution applied to the surface of the slurry. It is desired to have sufficient gelling agent to harden through the depth of the layer to which the gelling agent is applied with enough left over to permit bonding to the next layer of slurry.

In order to avoid interlayer defects, the amount of gelling agent to exposed surface area must be controlled. In some cases, it is preferred to avoid having excess gelling agent that may interfere with the physical and other functional properties of the ceramic. When a divalent cation solution is used, specifically calcium chloride, the concentration of calcium is preferably at least 0.001M and may be as high or higher than 5M to achieve a substantially instantaneous or instantaneous gelation.

It is further preferred that the spray droplets of the gelling agent be as small and as uniform as practical. Air brushes achieve from 10 micron to 100 micron droplet size whereas ultrasonic nebulizers can achieve 1–5 micron size droplets.

Upon formation of the hardened object, the hardened object may be further hardened either by immersing in an additional gelling agent or by curing when a curable process additive is used. The further gelling agent may be of a different concentration compared to the gelling agent.

The hardened layered object may be further rinsed to remove unwanted gelling agent. Rinsing is preferably done with water or the solvent used to prepare the slurry. In situations where gelling agent is of no consequence, rinsing is not necessary.

Example 1

An experiment was conducted to demonstrate the usefulness of the present invention for solid freeform fabrication.

The polysaccharide used in the experiment was ammonium alginate (Amoloid LV, Kelco Division of Merck, Inc., San Diego, Calif.), the suspension medium was water, and the powder was alumina with 0.05 wt % magnesia (RC-HP DBM, Malakoff Industries, Malakoff, Tex.). The average particle size of the alumina powder was 0.35 microns. An ammonium polyacrylate dispersant, (Darvan 821A, R. T. Vanderbilt Co., Norwalk, Conn.) was used to prepare a low viscosity slurry. A 2 wt % solution of the alginate was prepared about 24 hours in advance in order to effect complete dissolution. A pre-slurry containing 95.8 g deionized water, 3.09 g of the ammonium polyacrylate dispersant, and 0.2 g of sodium citrate (sequestrant used to prevent premature gelation by impurity ions) and 494.9 g of the alumina powder was also prepared. The dispersant and the citrate sequestrant were first dissolved in the water. Next the alumina powder was slowly added and mixed. The mixture was ball-milled in high-density polyethylene milling jars with zirconia media, for about 16–24 hours. The pre-slurry was then decanted into a beaker, and the appropriate amount of the alginate solution mixed to form the slurry. 25.75 g of the alginate solution was used for 593.78 g of the slurry. This resulted in 0.4 wt % alginate with respect to the suspension medium. The powder loading in the new slurry was now 50 vol %. This slurry was magnetically stirred, and sonicated for a few minutes. The slurry was then desired under vacuum to remove entrapped air, before being used to put down layers on the build table for freeform fabrication.

The salt solution was 5M calcium chloride, applied with an air brush.

The apparatus used is shown in FIG. 1. The slurry 100 was poured into a chamber 102 creating a slurry surface 103. A build table 104 is raised to just below the surface 103 and the slurry surface 103 levelled with a straight edge scraped across an upper rim 105 of the chamber 102. The distance from the top of the build table 104 to the slurry surface 103 is the thickness of the layer. A stencil 106 was placed over the levelled slurry and droplets of calcium chloride 108 were sprayed from an airbrush 109 through the stencil 106 onto the slurry surface 103. After spray gelation, the build table 104 was lowered with a micrometer 110, additional slurry was added to form another layer reaching the rim 105 and the previous steps repeated to form a layered block (not shown). The green density of the layered block was approximately 50% after drying. Layered blocks were made having a total thickness ranging from 1 to 10 mm, wherein layer thicknesses were varied from 0.1 mm (100 microns) to 1 mm. The hardened blocks were rinsed for 12 hours in flowing water, dried, and sintered at 1600° C. for one hour. Layered blocks were sectioned and examined with high magnification optical and scanning electron microscopy. Layered objects having layer thicknesses of 1 mm and 0.5 mm exhibited interlayer defects whereas layered blocks with layer thicknesses of 0.25 mm and 0.1 mm exhibited no interlayer defects. Upon firing, linear shrinkage was about 20%, yielding dense single-phase, fine-grained alumina microstructures.

Calcium levels were measured along the mid-section of a sintered ten-layer sample, about 8 mm in thickness, using EDS/SEM x-ray analysis. Calcium levels were near or below detectable limits (less than 500 parts per million).

The amount of salt solution per unit exposed area, solution/area ratio, was investigated as well. It was found that interlayer defects were present with solution/exposed area ratios greater than or equal to 1 microliter/cm$^2$. Interlayer defects were avoided by using solution/exposed area ratios much less than 1 microliter/cm$^2$. More specifically, the solution/exposed area ratio was estimated to be less than about 0.5 microliter/cm$^2$ and possibly less than about 0.25 microliter/cm$^2$ to avoid interlayer defects. Calcium was undetectable for solution/area ratio less than 1 microliter/cm$^2$.

Example 2

Figure 2:
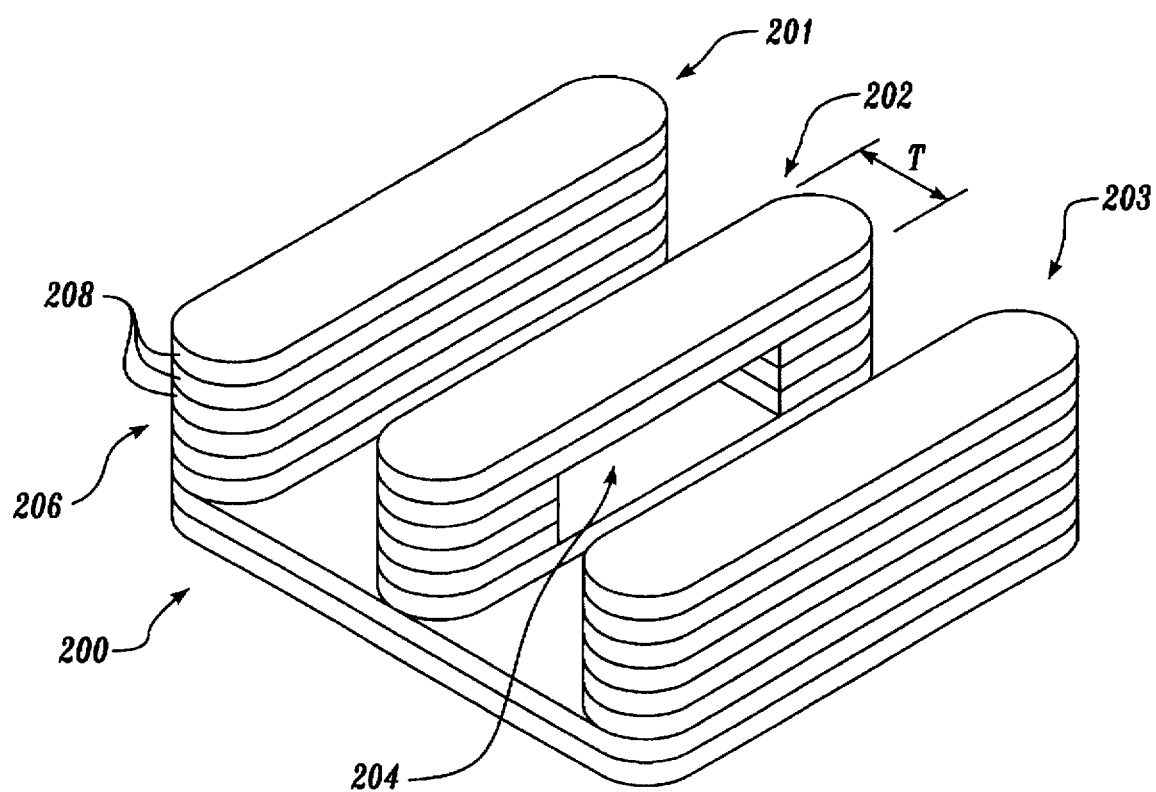
FIG. 2 is an isometric sketch of a three dimensional complex object fabricated by the spray gelation method of the present invention.

Using the slurry and method as described in Example 1, a further experiment was conducted to demonstrate that a structure containing an unmachinable slot could be fabricated. The structure is shown in FIG. 2. The structure 200 has three vertical parallel walls 201, 202, 203 wherein the center wall 202 has a slot 204 through the thickness T of the center wall 202. The structure 200 was fabricated and sintered, demonstrating fabrication of an unmachinable structure.

Layer Thickness

As previously stated, maintaining layer thickness at about 250 micron or less, avoids interlayer defects. However, it may also be necessary to achieve a smooth side surface 206 (FIG. 2). The thinner the layers 208, the smoother the side surface 206. Thus, layer thickness of less than 100 micron may be used. For very smooth, precise results, layer thickness less than about 10 micron may be used.

Closure

While a preferred embodiment of the present invention has been shown and described, it will be apparent to those skilled in the art that many changes and modifications may be made without departing from the invention in its broader aspects. More specifically, the method of the present invention may be combined with automated methods of layering ceramic slurry, salt solution spray control of duration and droplet size, and part positioning. For example, a "three dimensional printer" may be modified to dispense and level layers of slurries. Salt solution droplets as small as about 0.001" (25 microns) may be deposited on selected portions of the layers from an ink jet printer head. Alternatively, a spray or mist may be focused through an x-y control nozzle. Further, laser cut masks may be used, and droplets of gelling agent dispensed therethrough. In terms of slurry composition, other processing additives such as dispersants and binders may also be used with the gelling polysaccharides to improve slurry characteristics and gelled strengths. Specifically, binders may include non-polysaccharide monomers or oligomers curable or cross-linkable with thermal, chemical or radiation methods, which may be used to improve strength for example.

The appended claims are therefore intended to cover all such changes and modifications as fall within the true spirit and scope of the invention.

We claim:

1. A method of solid freeform fabrication having the steps of (a) making a layer of unhardened ceramic material, (b) hardening selected portions of said layer, (c) repeating steps (a) and (b) and forming a layered object, the improvement comprising the steps of:
   (a) preparing said unhardened ceramic material by mixing powder particles with a suspension medium containing a gelling polysaccharide and forming a powder slurry;
   (b) making said layer by depositing an amount of said powder slurry in a confined region; and wherein
   (c) said hardening is accomplished by applying a gelling agent to said selected portions.

2. The method as recited in claim 1, wherein the gelling polysaccharide is selected from the group consisting of alginates, carrageenans, pectins and combinations thereof.

3. The method as recited in claim 2, wherein the alginate is ammonium alginate.

4. The method as recited in claim 1, wherein said gelling agent contains a divalent cation.

5. The method as recited in claim 4, wherein the divalent cation is calcium.

6. The method as recited in claim 1, wherein said layer has a thickness less than about 100 microns.

7. The method as recited in claim 1, wherein an amount of gelling agent is sufficient for hardening said layer through a thickness of said layer and for bonding to an additional layer.

8. The method as recited in claim 1, further comprising mixing processing additives into said slurry.

9. The method as recited in claim 8, wherein said processing additive is a dispersant.

10. The method as recited in claim 1, further comprising the step of removing any unhardened material from the hardened layered object.

11. The method as recited in claim 10, further comprising the steps of drying, heating and sintering.

12. The method as recited in claim 10, further comprising rinsing the hardened layered object and removing unwanted gelling agent.

13. The method as recited in claim 12, further comprising the steps of drying, heating and sintering.

14. The method as recited in claim 10, further comprising the step of immersing the hardened layered object in a further gelling agent to further harden said hardened layered object.

15. The method as recited in claim 14, further comprising the steps of drying, heating and sintering.

16. The method as recited in claim 14, further comprising rinsing the hardened layered object and removing unwanted gelling agent and unwanted further gelling agent.

17. The method as recited in claim 16, further comprising the steps of drying, heating and sintering.

18. The method as recited in claim 1, further comprising the steps of drying, heating and sintering.

19. A method of solid freeform fabrication, comprising the steps of:
   (a) mixing powder particles with a suspension medium and a gelling polysaccharide and forming a powder slurry;
   (b) making a layer by depositing an amount of said powder slurry in a confined region;
   (c) hardening a selected portion of the layer by applying a gelling agent to said selected portion; and
   (d) repeating steps (b) and (c) to make successive layers and forming a hardened layered object.

20. The method as recited in claim 19, wherein said powder is selected from the group consisting of ceramic, metal, polymer, and combinations thereof.

21. The method as recited in claim 19, wherein the gelling polysaccharide is selected from the group consisting of alginates, carrageenans, pectins and combinations thereof.

22. The method as recited in claim 21, wherein the alginate is ammonium alginate.

23. The method as recited in claim 19, wherein said gelling agent contains a divalent cation.

24. The method as recited in claim 23, wherein the divalent cation is calcium.

25. The method as recited in claim 19, wherein said layer has a thickness less than about 100 microns.

26. The method as recited in claim 19, wherein an amount of gelling agent is sufficient for hardening said layer through a thickness of said layer and for bonding to an additional layer.

27. The method as recited in claim 19, further comprising mixing processing additives into said slurry.

28. The method as recited in claim 27, wherein said processing additive is a dispersant.

29. The method as recited in claim 19, further comprising the step of removing any unhardened material from the hardened layered object.

30. The method as recited in claim 29, further comprising the steps of drying, heating and sintering.

31. The method as recited in claim 29, further comprising rinsing the hardened layered object and removing unwanted gelling agent.

32. The method as recited in claim 31, further comprising the steps of drying, heating and sintering.

33. The method as recited in claim 29, further comprising the step of immersing the hardened layered object in a further gelling agent to further harden said hardened layered object.

34. The method as recited in claim 33, further comprising the steps of drying, heating and sintering.

35. The method as recited in claim 33, further comprising rinsing the hardened layered object and removing unwanted gelling agent and unwanted further gelling agent.

36. The method as recited in claim 35, further comprising the steps of drying, heating and sintering.

37. The method as recited in claim 19, further comprising the steps of drying, heating and sintering.

* * * * *

UNITED STATES PATENT AND TRADEMARK OFFICE
CERTIFICATE OF CORRECTION

PATENT NO. : 5,697,043
DATED : 12/09/97
INVENTOR(S) : Suresh Baskaran, Gordon L. Graff It is certified that error appears in the above-identified patent and that said Letters Patent is hereby corrected as shown below:

In column 2, line 60, please change "With" to --with--.

In column 6, line 7, please change "desired" to --deaired--.

Signed and Sealed this

Nineteenth Day of January, 1999

Attest:

*Acting Commissioner of Patents and Trademarks*

*Attesting Officer*